US009751227B2

(12) United States Patent
Tomassetti et al.

(10) Patent No.: US 9,751,227 B2
(45) Date of Patent: Sep. 5, 2017

(54) METHOD AND SYSTEM FOR REGULATING ELECTRIC CURRENT FLOW FROM A POWER SOURCE TO A BLADE CARTRIDGE IN A WET SHAVE RAZOR

(71) Applicant: Heated Blades Holding Company, LLC, Pompano Beach, FL (US)

(72) Inventors: Louis D. Tomassetti, Pompano Beach, FL (US); William Bohmer, Randolph, NJ (US)

(73) Assignee: Heated Blades Holding Company, LLC, Pompano Beach, FL (US)

( * ) Notice: Subject to any disclaimer, the term of this patent is extended or adjusted under 35 U.S.C. 154(b) by 0 days.

(21) Appl. No.: 15/232,400

(22) Filed: Aug. 9, 2016

(65) Prior Publication Data

US 2016/0346943 A1 Dec. 1, 2016

Related U.S. Application Data

(62) Division of application No. 14/080,903, filed on Nov. 15, 2013, now Pat. No. 9,440,366.

(51) Int. Cl.
*B23K 11/24* (2006.01)
*B26B 21/40* (2006.01)
*B26B 21/48* (2006.01)

(52) U.S. Cl.
CPC ............ *B26B 21/405* (2013.01); *B26B 21/48* (2013.01); *Y10T 307/406* (2015.04)

(58) Field of Classification Search
CPC .... B26B 21/405; B26B 21/48; Y10T 307/406
See application file for complete search history.

(56) References Cited

U.S. PATENT DOCUMENTS 5,151,577 A * 9/1992 Aspden .................. F24D 13/02 219/212
7,235,900 B1 * 6/2007 Couture .................. H02G 7/20 219/482

* cited by examiner

*Primary Examiner* — Daniel Cavallari
(74) *Attorney, Agent, or Firm* — Robert M. Downey, P.A.

(57) ABSTRACT

A method for regulating current flow in a wet shave razor includes one or more conductive materials, such as metals, in electric circuit connection, wherein each conductive material has unique resistance properties and is used to regulate the amount of current (i.e. heat) flowing to at least one electrically powered component on the blade cartridge, and particularly one or more electrically powered devices/elements on the blade cartridge such as, but not limited to, one or more blades, one or more heating elements, a vibration device, illuminating device (e.g. LED or bulb), gauges, or indicators. The length and thickness of the conductive materials used in the electric circuit further affects the total circuit resistance and, accordingly, the amount of current flowing to the blade cartridge for heating the blades. In other embodiments, the dissimilar material conductors may be used to regulate current flow to alternative electrically conductive components.

8 Claims, 2 Drawing Sheets

METHOD AND SYSTEM FOR REGULATING ELECTRIC CURRENT FLOW FROM A POWER SOURCE TO A BLADE CARTRIDGE IN A WET SHAVE RAZOR

BACKGROUND OF THE INVENTION

This non-provisional patent application is a divisional application based on non-provisional patent application Ser. No. 14/080,903 filed on Nov. 15, 2013.

FIELD OF THE INVENTION

The present invention relates to wet shave razors and, more particularly, a method and system for regulating electric current flow from an electric power storage source to a blade cartridge, including one or more blades and/or any part of the blade cartridge superstructure of a wet shave razor.

DISCUSSION OF THE RELATED ART

When shaving with a wet shave razor, it is generally desired to warm the blades and/or blade cartridge superstructure for increased comfort. Moreover, it is well established that heated blades are capable of cutting hair more effectively than blades at room temperature. Users of traditional non-heated blade razors generally run hot water over the blades prior to use, a process which must be frequently repeated because the heat dissipates quickly from the blades and surrounding cartridge material. To counter this problem, electrically powered wet shave razors have been developed which serve to electrically heat either the blades or areas of the surrounding cartridge superstructure during use. A common problem associated with heating the blades is the difficulty associated with regulating the temperature of the blades, which often causes the blades to become uncomfortably hot, or not warm enough, when contacting a user's skin. While it is possible to use microelectronics to regulate the electrical current going through the blades to maintain the blades within a particular temperature range, use of microelectronics for his purpose has inherent drawbacks. For example, use of microelectronics for regulating electric current is costly, prone to malfunction, and does not work well in wet environments.

Therefore, there remains a particular need to provide a low-cost electrically powered wet shave razor that efficiently regulates electric current flow from an electric power storage source (e.g. battery source in the handle) to the blade cartridge for controlled operation of one or more electrically powered devices/elements on the blade cartridge such as, but not limited to, one or more blades, one or more heating elements (i.e. attached to the back of the blades or embedded within or attached to the cartridge frame), a vibration device, illuminating device (e.g. LED or bulb), gauges, or indicators.

SUMMARY OF THE INVENTION

The present invention is directed to a method for regulating electric current flow in a wet shave razor using dissimilar material conductors in an electric circuit between a battery power source and the blade cartridge, and particularly one or more electrically powered devices/elements on the blade cartridge such as, but not limited to, one or more blades, one or more heating elements (i.e. attached to the back of the blades or embedded within or attached to the cartridge frame), a vibration device, illuminating device (e.g. LED or bulb), gauges, or indicators. Specifically, a combination of conductive materials, such as metals, in connection, wherein each conductive material has unique resistance properties, is used to regulate the amount of current (i.e. heat) flowing to the blade cartridge. The length and thickness of the conductive materials used in the electric circuit further affects the total circuit resistance and, accordingly, the amount of current flowing to the blade cartridge. Use of dissimilar material conductors in connection with a battery power source to regulate current flow could be utilized for directly heating the razor blades or, alternatively, for regulation of lighting and/or gauges on the cartridge or regulation of heating elements on the cartridge for added shaving comfort. In other embodiments of the invention, the material conductors in the electric circuit connection are used to regulate the amount of current flowing to an electrically powered component on the blade cartridge.

OBJECTS AND ADVANTAGES OF THE INVENTION

Considering the foregoing, it is a primary object of the present invention to provide a method for regulating the electric current flow to the blade cartridge of a wet shave razor using dissimilar material conductors.

It is a further object of the present invention to provide a cost efficient system for regulating the electric current flow to the blade cartridge in a wet shave razor.

These and other objects and advantages of the present invention are more readily apparent with reference to the following detailed description and the accompanying drawings.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF INVENTION

Referring to the several views of the drawings, the system for regulating electric current flow from a power source to a blade cartridge on a wet shave razor is shown and is generally indicated as 10.

Figure 1:
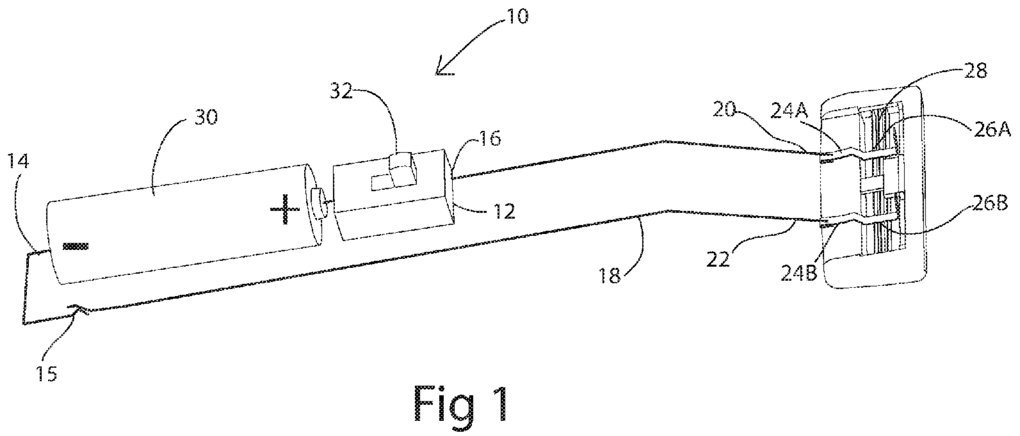
FIG. 1 is a perspective view of one embodiment of the heated blade razor illustrating the internal components of the heated blade razor.

Referring to FIG. 1, a first embodiment of the heated blade razor system 10 includes a main body 12 having a ground contact component 14, a cap contact component 15, a power lead component 16, a ground lead component 18, a power lead contact component 20, a ground lead contact component 22, a first and second contact component 24A and 24B, and a first and second blade lead contact component 26A and 26B. Each component 14-26B is in electric circuit connection with one or more blades 28 held together in a blade cartridge and is made from a particular material conductor selected for generation of optimum blade 28 temperature, wherein one or more of the material conductors are dissimilar from the other material conductors. The dissimilar material conductors may be selected from a group of materials including, but not limited to: stainless steel, brass, and nickel-chromium alloy.

Still referring to FIG. 1, the heated blade razor 10 includes a battery power source 30 in connection with a switch 32 (4.5 Amp) for powering the heated razor 10. In operation, the switch 32 is moved to the ON position by the user to close the electric circuit, thereby sending electric current flow through the blades 28 to heat the blades 28. The temperature of the blades is dependent on the particular material conductors selected for each of the ground contact component 14, the cap contact component 15, the power lead component 16, the ground lead component 18, the power lead contact component 20, the ground lead contact component 22, the first and second contact components 24A and 24B, and the first and second blade lead contact components 26A and 26B. Other variables, such as wire length and wire width of the electric circuit components 14-26B, may be altered in order to produce a particular blade temperature. The wires forming the electric circuit components 14-26B may be coiled in order to maximize wire length within a compact area for increasing the total resistance of the circuit. For example, the wires can be arranged in a cylindrical coil or a spiraling coil in order to increase the length of the wire within the compact area provided. An insulating material may be used in between the wire coils or, alternatively, the wires may include an insulating jacket for preventing the wire from contacting itself.

The following table provides an example of the material conductors selected for components 14-26B of heated razor 10:

| Component | Material Conductor |
|---|---|
| Ground contact component (14) | Stainless steel |
| Cap contact component (15) | Brass |
| Power lead component (16) | Brass |
| Ground lead component (18) | Brass |
| Power lead contact component (20) | Brass |
| Ground lead contact component (22) | Brass |
| Contact components (24A, 24B) | Brass |
| Blade lead contact components (26A, 26B) | Nickel-chromium |

Figure 2:
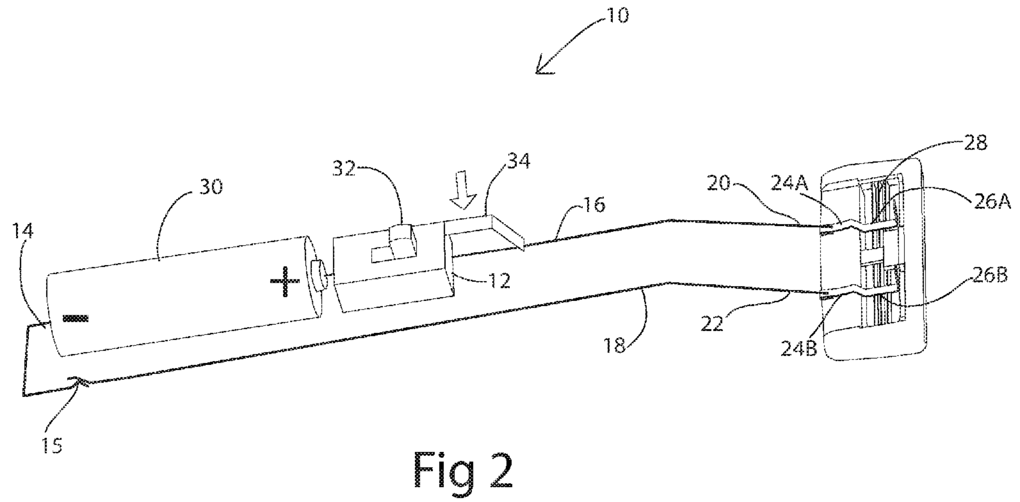
FIG. 2 is a perspective view of an alternative embodiment of the heated razor illustrating the internal components thereof.

Referring to FIG. 2, an alternative embodiment of the heated blade razor 10 is shown, wherein the main body 12 includes a button 34 for engaging an additional loop to the electric circuit in order to increase the total resistance of the circuit, thereby decreasing the amount of electric current flow to the blade cartridge and decreasing the temperature of the one or more blades 28 while the button 34 is engaged. In operation, button 34 may be pressed by the user during the shaving process in order to decrease the temperature of the blades 28. When the button 34 is released, the additional loop is disengaged and the temperature of the blades 28 returns to the original (i.e. hotter) temperature. Additional loops may be added to the circuit which, when engaged, further decrease the temperature of the blades.

Figure 3A:
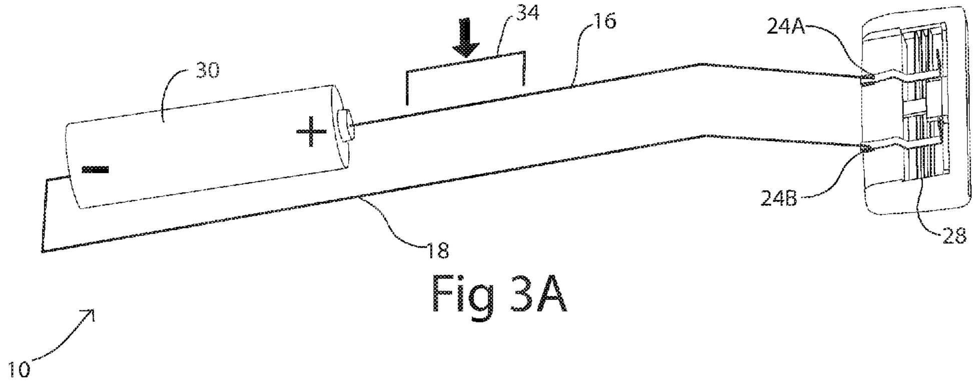
FIG. 3A is a schematic illustration showing the closed electric circuit of the heated blade razor in its resting state.
Figure 3B:
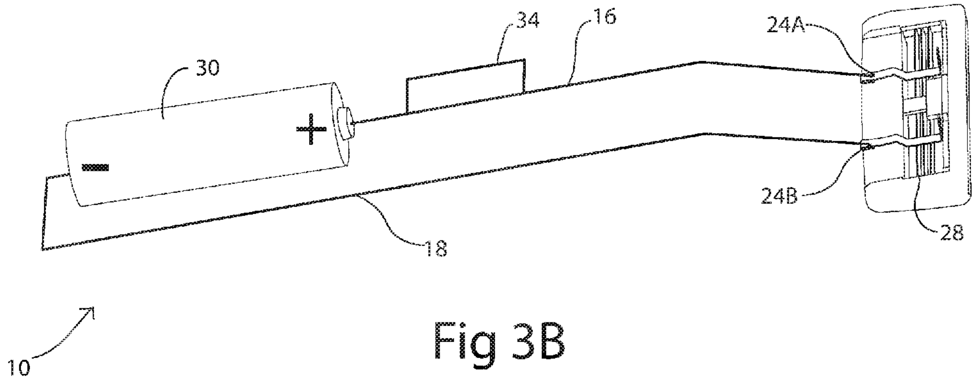
FIG. 3B is a schematic illustration showing the closed electric circuit of the heated blade razor with an additional loop added to the electric circuit.

Referring to FIGS. 3A and 3B, the process described above, wherein button 34 is pressed by the user during the shaving process in order to engage an additional loop to the electric circuit so that the distance the electric current flow travels is increased and the blades are cooled, is shown. FIG. 3A illustrates the electric circuit in its resting state, wherein button 34 is not pressed. FIG. 3B illustrates the electric circuit with the additional loop created when button 34 is engaged for decreasing the temperature of blades 28. Additional loops may be added to the circuit which, when engaged, further control the temperature of the blades.

Figure 4:
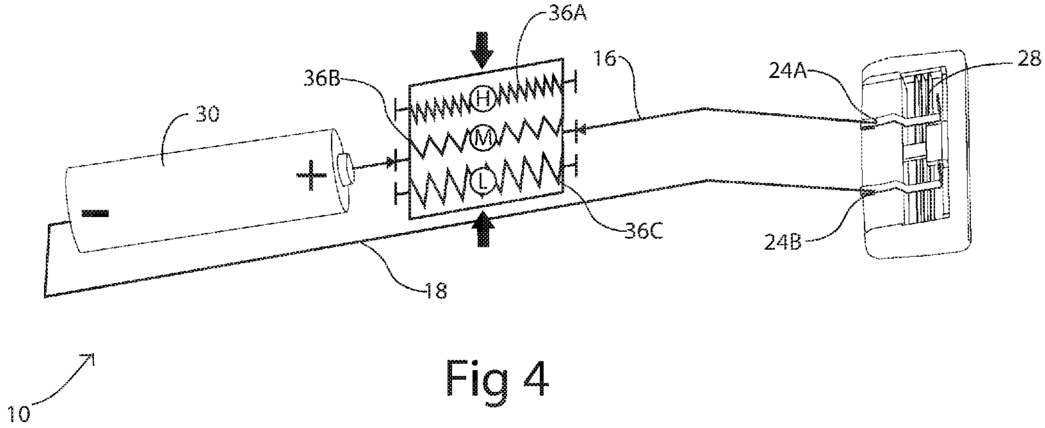
FIG. 4 is a schematic illustration showing an alternative embodiment of the closed electric circuit of the heated blade razor and including three different material conductor segments being selectively operable by a user.

Referring to FIG. 4, the use of dissimilar material conductors in connection with a battery power source 30 for regulating electric current flow can be utilized in a system including two or more separate circuits, each having a unique set of material conductors and each circuit having a different resistance, wherein the user can alternate between each of the two or more circuits to send a different electric current flow (e.g. high, medium, low) to the blade cartridge. As shown in FIG. 4, one embodiment of the heated blade razor 10 includes separate material conductors 36A, 36B and 36C selectively operable using a slide switch (not pictured) to put one of the separate material conductors 36A, 36B or 36C in connection with opposite ends of power lead component 16. Each of the separate material conductors 36A, 36B and 36C has a different resistance for producing a unique electric current flow in the circuit, such as high (least resistance), medium (medium resistance) and low (most resistance), as indicated by the H, M, and L on FIG. 4.

Use of dissimilar material conductors in connection with a battery power source 30 for regulating electric current flow could be utilized for applications other than directly heating the razor blades 28. Examples of alternative applications for use of dissimilar material conductors for regulating current flow to an electrically conductive component include, but are not limited to, regulation of lighting on the blade cartridge, gauges, indicator and/or regulation of heating elements on the blade or blade cartridge for added shaving comfort.

Use of dissimilar material conductors in connection with a battery power source 30 can be used in conjunction with one or more light emitting diodes (LEDs) or bulbs as part of the electric circuit with means for selectively connecting and disconnecting (e.g. a switch) each LED or bulb to the circuit, wherein each LED or bulb adds further resistance to thereby allow for further regulation of current flow. The LEDs or bulbs can serve as indicators (e.g. temperature indicators) in addition to providing the function of varying the total resistance in the circuit.

While the present invention has been shown and described in accordance with several preferred and practical embodiments, it is recognized that departures from the instant disclosure are contemplated within the spirit and scope of the present invention which are not to be limited except as defined in the following claims as interpreted under the Doctrine of Equivalents.

What is claimed is:

1. A method of regulating current flow in an electrically operated device that receives electric current flow from an electric power source for operating at least one component on the device, said method comprising the steps of:

providing a plurality of different material conductors for use to form an electrical circuit connected between the electric power source and the at least one electrically powered component;

determining a total resistance amount in the electric circuit needed to achieve a desired electric current flow for operating the at least one electrically powered component;

selectively modifying the specific electric resistance of at least one of said plurality of different material conductors in order to achieve the total resistance in the electric circuit; and interconnecting the plurality of different material conductors between the electric power source and the at least one electrically powered component to create the electric circuit.

2. The method of regulating current flow in an electrically operated device as recited in claim 1 further comprising the step of:

substituting at least one of said plurality of different material conductors with a new material conductor to alter the total resistance in the electric circuit.

3. The method of regulating current flow in an electrically operated device as recited in claim 1 wherein each of said plurality of different material conductors has a unique length.

4. The method of regulating current flow in an electrically operated device as recited in claim 1 wherein each of said plurality of different material conductors has a unique width.

5. The method of regulating current flow in an electrically operated device as recited in claim 1 wherein said at least one component is at least one electrically conductive blade.

6. The method of regulating current flow in an electrically operated device as recited in claim 5 wherein said at least one component is at least one heating element in contact with said at least one electrically conductive blade.

7. The method of regulating current flow in an electrically operated device as recited in claim 1 wherein said at least one electrically powered component is at least one heating element in contact with a blade cartridge of a shaving razor.

8. The method of regulating current flow in an electrically operated device as recited in claim 7 wherein said at least one electrically powered component is at least one light in contact with said blade cartridge.

* * * * *